United States Patent
Stacy, Jr.

[15] 3,692,130
[45] Sept. 19, 1972

[54] IMPROVED OVERLAND VEHICLE

[72] Inventor: Jack C. Stacy, Jr., Rt. 2, Box 184, Santa Fe, N. Mex. 87501

[22] Filed: Feb. 24, 1970

[21] Appl. No.: 13,526

[52] U.S. Cl. .................................. 180/5 R, 305/27
[51] Int. Cl. ............................................. B62m 27/02
[58] Field of Search ............................... 180/5, 9.24

[56] References Cited

UNITED STATES PATENTS

| 3,435,907 | 4/1969 | Imhoff | 180/5 |
| 3,480,096 | 11/1969 | Hammitt | 180/5 |
| 3,494,438 | 2/1970 | Rose | 180/5 |
| 3,521,717 | 7/1970 | Coons | 180/5 |

OTHER PUBLICATIONS

Jetstar '72 Advertising Brochure of Hellstar Corp., Wahoo, Neb., Received 5-21-71

*Primary Examiner*—Richard J. Johnson
*Attorney*—James E. Snead

[57] ABSTRACT

An improved multi-purpose overland vehicle used for traversing dry land as well as snow, sand, and wet or marshy land, having an improved independent front suspension and steering system, with a mechanism for quickly exchanging front wheels for skis and vice versa, and a wobble boggie drive track support system, suspended by longitudinal leaf springs designed so as to provide maximum traction when traversing rough terrain and to elevate the rear idler sprocket mechanism of the track support assembly if desired.

6 Claims, 11 Drawing Figures

JACK C. STACY JR
INVENTOR

IMPROVED OVERLAND VEHICLE

BACKGROUND OF THE INVENTION

1. Field of the Invention

This invention relates to an improved overland vehicle. In particular it incorporates an improved independent front suspension and steering system, an improved wobble boggie drive track support system, and an improved rear idler sprocket elevating mechanism assembly, which vehicle is useful for traversing dry land as well snow, sand, and wet or marshy terrain or other terrain which is difficult for normal vehicles.

2. Description of the Prior Art

There are in the prior art many overland type vehicles including snowmobiles, dune buggies and four wheel drive vehicles. These vehicles, however, have a limited range of uses. There has been considerable activity in recent time directed toward developing an overland vehicle useable alternatively as a snowmobile and a dune buggy. The prior art vehicles incorporate many disadvantages rendering them unsuitable as a snowmobile, as a vehicle for sand and/or wet or marshy land or as a multi-purpose overland vehicle.

Some of the prior art vehicles incorporate features allowing interchange of wheels and skis. However, these prior art vehicles have complicated exchange mechanism, or mechanisms which do not provide a secure attachment comfort the wheels or skis as the case may be. Additionally, the front suspension system provides a rough, jerky ride with excessive ski vibration rendering the vehicle uncomfortable in operation and difficult to control.

In present snowmobiles each ski is attached to the vehicle at a pivot point to allow movement of the ski in the vertical plane. This pivot point has caused problems both as to comfort in the ride and as to operational safety due to excessive vibration of the skis during operation of the vehicle and excessive pivotal movement when the skis leave the ground, as when the vehicle goes over a hill at high speed.

Additionally, in the prior art many traction systems have been devised for driving snowmobiles or dry land vehicles, including use of a plurality of large wheels or an endless belt type track. These prior art devices, however, do not allow for maximum contact of the propulsion mechanism with the surface in operations over rough terrain, nor do they allow for flexibility and smooth operation of the track in operating over an uneven or rough surface. Multi-wheel vehicles do not have sufficient traction or flotation in ice or snow, and track type vehicles have excessive wear when operated over dry land.

Further, the prior art track type machines do not allow for independent spring suspension of the boggie wheels to provide a smooth ride, minimize tilting of the vehicle and reduce wear on the edges of the track, nor do they allow for pivoting of each boggie independently from the others. Prior art vehicles have encountered the problem of the vehicle lurching and rolling with incumbent track wear and danger of its tipping over or losing traction when one side moves over a large obstacle or the vehicle is turned.

One difficulty in prior art vehicles is that they are not readily altered for use both as a dry land vehicle and as a snowmobile. For example, the surface over which a snowmobile must operate is slick and often soft and requires maximum flotation and contact of the propulsion mechanism with the surface in order to spread the weight of the vehicle over as large an area as possible and to provide maximum traction. A track type drive system has been found to be most suitable for such use. On the other hand, the track mechanism when used in sand tends to pick up the sand which goes into the track support mechanism and either wears or fouls the drive and support system. It is therefore desirable to elevate the rear track idler sprocket assembly when the device is used to traverse loose earth or sand. Additionally, it is desirable to be able to quickly exchange skis for wheels so that the vehicle can be readily changed from a snow vehicle to a land vehicle and vice versa.

BRIEF DESCRIPTION OF THE INVENTION

It is therefore an object of this invention to provide an improved overland vehicle which may be used alternatively for traversing dry land, as well as snow, sand or wet or marshy land.

Another object of the present invention is to provide an improved overland vehicle with an improved steering and independent front suspension system wherein the front wheels may be exchanged for skis quickly and conveniently with a secure attachment.

A further object of this invention is to provide an improved overland vehicle wherein vibration and movement of the skis during operation is damped.

A further object of this invention is to provide an improved overland vehicle wherein the boggie drive track support mechanism stabilizes the vehicle, insures maximum contact of the track with the surface over which the vehicle is passing and is adaptable for use either as a snowmobile or for traversing dry land, sand and wet or marshy land.

Other objects and advantages of the present invention will become obvious as the same is better understood by reference to the following specification and accompanying drawings wherein:

BRIEF DESCRIPTION OF THE DRAWINGS

FIG. 2 is an isometric view of the improved overland vehicle partially cutaway to show the steering, propulsion and boggie systems.

FIG. 8 is a side view of the wobble boggie system.

FIG. 9 is a top elevation of the wobble boggie system.

FIG. 10 is a top view of the double "A" frame support assembly comprising a part of this invention.

DETAILED SPECIFICATION

Referring now to the drawings, it will be seen that improved overland vehicle 20 consists in general of a body assembly 21, a steering assembly 22, referred to generally in FIG. 2, and a track drive support 23, shown in the partially cutaway isometric view in FIG. 2.

Body assembly 21 includes a windshield 26, a nose cover 27, a front bumper 28, a pair of wheel well skirts 29, secured to the wheel wells on each side of nose cover 27, an engine and transmission cover 30, a seat 31, track support housing 32, a pair of foot brackets 33, a pair of back rest brackets 34, a pair of locking slots 35 for the rear drive track idler sprocket assembly to be hereinafter more particularly described, a gas tank 36 located beneath seat 31, storage compartment 37, storage compartment lid 38, rear bumper 39, and a hand grip 40 on rear bumper 39. It is to be understood that only one side of the vehicle is shown in most instances. Identical structure is provided on both sides of the vehicle where necessary.

Windshield 26 may be attached to body 21 in any suitable manner. It may be formed of plastic, plexiglass or any other flexible transparent material, sufficiently flexible and strong to withstand the vibrations and force of use of the vehicle. A suitable molding 41 consisting of any suitable molding material, such as aluminum, may be secured to nose cover 27 as by welds, glue, rivets, screws or other suitable attachment means. Windshield 26 is secured to nose cover 27 by means of molding 41. Nose cover 27 may be formed of any suitable material such as aluminum, molded fiberglass or plastic. The entire body of the vehicle including, motor and transmission cover 30 may be formed as a single molded unit to cover the front suspension assembly, motor and transmission 82 and a part of the traction system as shown in the partial cutaway view in FIG. 2. A light 24 or a plurality of similar lights may be affixed to the front of nose cover 27 and electrically connected to a battery in a well-known manner. The primary requirement of nose cover 27 is that it be light weight and durable. It should be formed as streamlined as possible to lessen wind resistance. Wheel wells may be formed in nose cover 27 to house wheels 60 when used with the vehicle. When skis 61 are used with the vehicle, the wheel wells are provided with a pair of wheel well covers 29 to close the wells and reduce accumulation of snow in the wheel wells.

Riding space for the driver and passengers is located to the rear of the windshield 26, nose cover 27 and motor and transmission cover 30. A seat 31 is affixed atop gas tank 36 with suitable cushion or other seat means thereon for the driver. Running boards 41 may be provided on each side of housing 32 and perpendicular thereto. Projection of seat 31 onto one of the extended exterior walls of storage compartment 37 provides a back rest for seat 31. A pair of foot brackets 33 are attached to each side of the body 32. These may take the form of "L" brackets, one on each side of body 32, into which the rider may insert his toes, or he may support his heels on them. A plurality of pairs of such foot brackets 33 may be provided if desired.

An additional back rest may be attached to the vehicle by means of a pair of back rest brackets 34. These brackets may be channel or slot type devices, one secured to each side of vehicle body 32 by any suitable means such as screws or rivets. A suitable "U" shaped back rest may then be formed with each leg of the "U" being inserted into one of the brackets and the bottom of the "U" projecting above and across the seat at the desired height to form a backrest.

When the vehicle is in operation the driver and passengers, if any, position themselves astride the vehicle with their feet on running boards 41. Foot brackets 33 may be used for additional support if desired.

Gas tank 36 is attached to housing 32 by any suitable means, or it may be molded as a part of the body if desired. Any suitable gas line means may be provided from gas tank 36 into motor 82 for supplying fuel to motor 32 to propel the vehicle.

A storage compartment 37 with a lid 38 secured thereto is formed in the rearmost portion of the housing 32 Lid 38 may be attached to compartment 37 as by hinge 42 and may have a closing latch as shown. A bumper 39 is secured to housing 32 by any suitable means such as welding or molding and hand grips 40 are provided thereon so that the rear passenger can reach behind him and support himself while riding on the vehicle. These grips may also be useful in handling the vehicle when necessary. Locking slots 35 are provided in each side of track housing 32 so that the actuating levers for the rear idler sprocket elevation mechanism, to be hereinafter described, may protrude through the housing.

Figure 3:
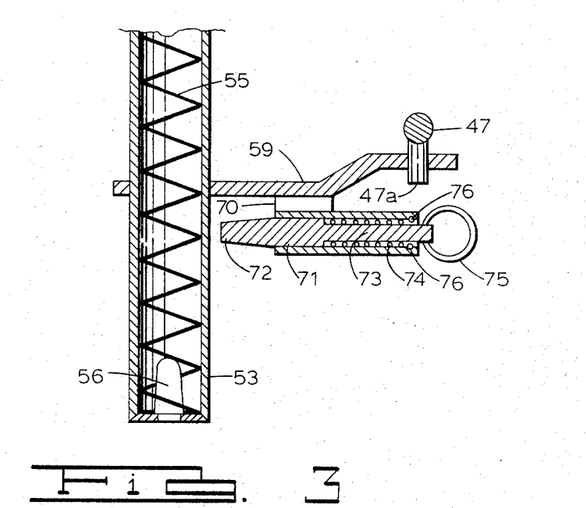
FIG. 3 is a cutaway view of the ski-wheel attachment mechanism.

The improved, independent front suspension system telescoping shown in detail in FIGS. 2, 3, 4 and 5. A "T" bar or other suitable steering mechanism 43, having a hand throttle 44 and a hand brake 45 secured thereto in a well-known manner, is connected to a tie rod linkage 46 to which are pivotedly connected right and left tie rods 47 and 48 respectively. An upper suspension mount 50 is fixedly secured to the body of the vehicle to provide the attachment means for the suspension system. First and second telescoping upper suspension supports 51 and 52 respectively are fixedly attached at one end to upper suspension mount 50 and each telescopes into a front suspension shaft 53 which in turn is connected into a surface contacting member such as a wheel or ski in a manner to be hereinafter more particularly described. A telescoping -type shock absorber 54 connects upper suspension supports 51 and 52 to each front suspension shaft 53 with an additional spring 55 secured within each front suspension shaft 53 and seated on a spring seat 56 at the bottom of each front suspension shaft 53 to provide additional shock absorbing qualities as shown in FIG. 3. Thus the spring action of shock absorbers 54 aided by the spring action of coil springs 55 provide the cushion support for the front suspension system.

Figure 11:
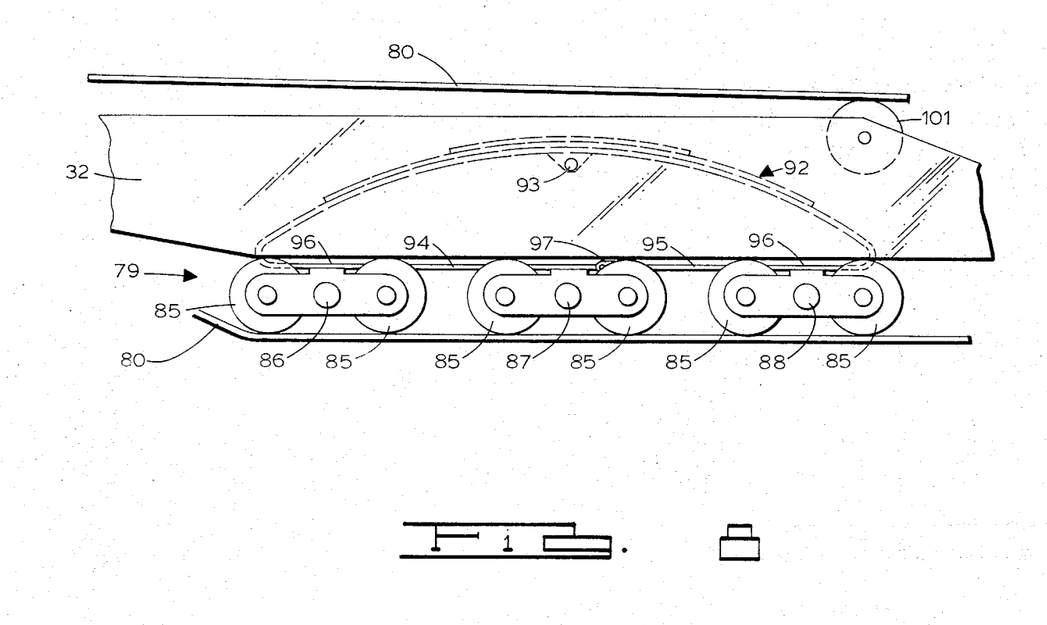
FIG. 11 is a cross sectional view of the telescoping-type shock absorber which comprises a part of this invention.

Telescoping shock absorber 54 is more particularly shown in FIG. 11. It consists of a top shock absorber plunger 54a with a dust cover 54c surrounding it. Dust cover 54c is connected to front suspension shaft 53 by a clamp 54d which can be any suitable clamp for securely attaching the dust cover 54c to front suspension shaft 53. Dust cover 54c is additionally connected at the top of shock absorber plunger 54a by a second clamp 54d. Top suspension plunger 54a is connected into front suspension shaft 53 by means of an oil seal and bushing 54e with a limit stop 54f connected thereto. The force of coil spring 55 is adjusted by adjustable spring stop 54g within top plunger 54c with the adjustable spring stop having a fluid orifice 54h therethrough. Adjustable spring stop 54g moves within top plunger 54a by means of its threaded interior portion 54i. Coil spring 55 is seated upon upper spring seat 54j attached to adjustable spring stop 54g.

As shown in FIG. 11, each telescoping type shock absorber 54 may be connected to upper suspension mount 50 by means of a rubber gromet 54k sandwiched between two cup washers 54l held in place by a nut and threated member 54m.

A double "A" frame support assembly connects each side of the suspension mechanism. Thus "A" arms 57 are pivotedly connected at one end to one of the front suspension shafts 53 by means of "U" brackets 57a and pivot pins 57b. The other end of each "A" arm 57 is pivotedly connected into second "U" brackets 58 by means of second pivot pins 58a. Thus front suspension shafts 53 and their attached suspension members are movably supported by the "A" frame support assembly. A metal bushing 53a pivotedly connects front suspension shafts 53 to shook absorber 54.

The double "A" frame is more particularly shown in FIG. 10 which is a top view looking down on the "A" frame assembly. "A" frame arms 57 are moveably connected to "U" brackets 57a by means of pivot pins 57b held in place by lock nuts 57c, washer 57d and rubber bushings 57e. The other ends of "A" frame arms 57 are connected to "U" brackets 58 by pivot pins 58a moveably connected together by lock nuts 58b, washer 58c and rubber gromets 58d.

It should be understood that the foregoing description of the telescoping-type shock absorber and the "A" frame are only representative of one way in which the two members of the invention can be constructed. There are other obvious ways that will become apparent from the foregoing disclosure.

Movement of T-bar steering rod 43 is transmitted to each front suspension shaft 53 through tie rods 47 and 48 which in turn are pivotedly connected by pivot pins 47a and 47b respectively to lever arms 59 fixedly secured to front suspension shafts 53 on each side of the vehicle. Pivot pins 47a and 48a are pivotedly secured to lever arms 59 by any suitable means such as by cotter keys. When the vehicle is in operating condition front suspension shafts 53 are connected either to a pair of wheels 60 or a pair of skis 61 for directing the motion of the vehicle. The "A" frame assembly prevents the skis or wheels from spreading apart, toeing in or moving forward or backward of the suspension system, while at the same time allowing up and down movement of the skis or wheels.

In the isometric view shown in FIG. 2 one wheel 60 is shown attached to one side of the suspension system and one ski 61 is shown attached to the other side of the suspension system in order to depict the relative positions of each of the members when assembled. It should be understood, of course, that in normal operation either a pair of wheels 60 or a pair of skis 61 is attached to the vehicle depending on whether the vehicle is to be used in snow or in some other terrain not suitable for skis.

Figure 4:
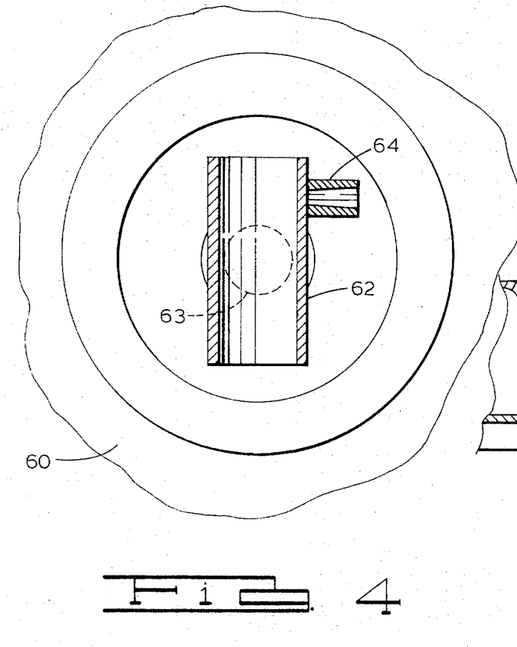
FIG. 4 is a partial cutaway view of a wheel attachment mechanism.
Figure 5:
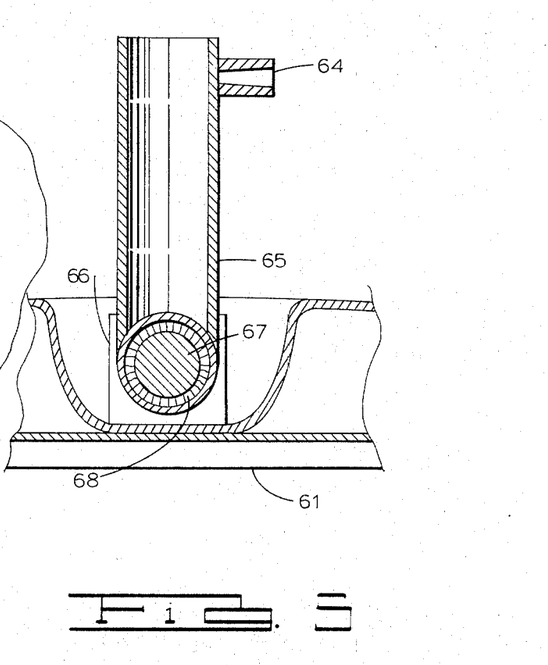
FIG. 5 is a partial cutaway view of a ski attachment mechanism.
Figure 6:
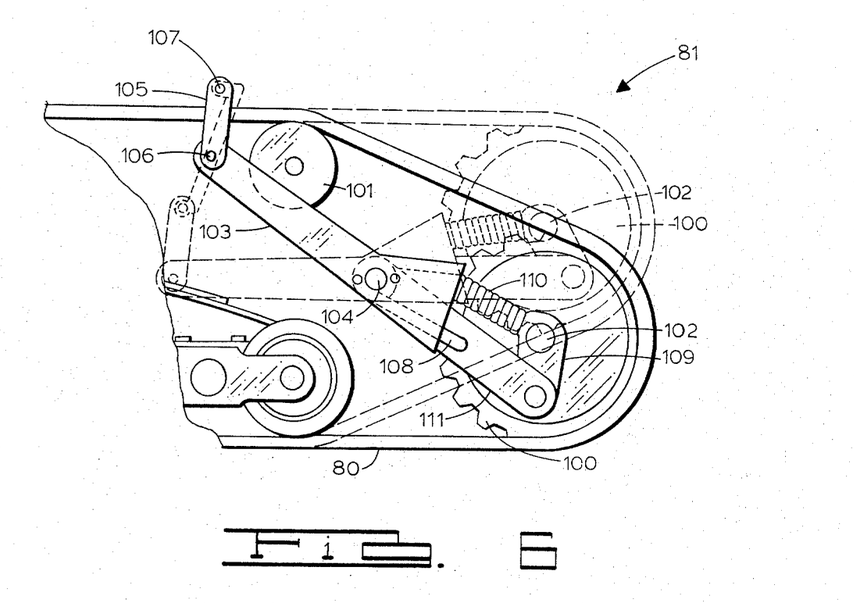
FIG. 6 is a side view of the rear track idler sprocket assembly.
Figure 7:
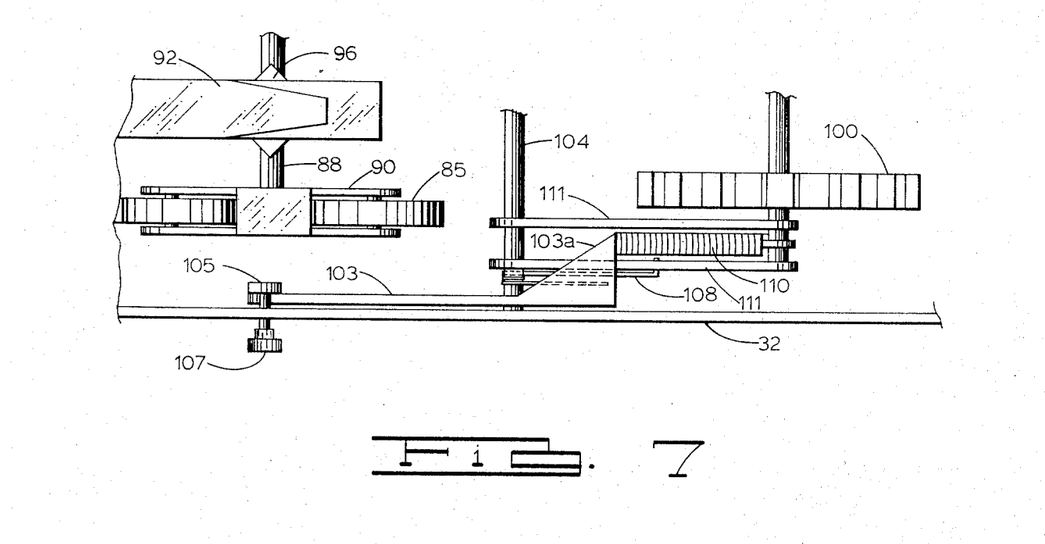
FIG. 7 is a top view of the reel track idler sprocket assembly.

Each wheel 60 is provided with a wheel attachment member 62 which is a hollow cylindrical tube or some other suitable hollow member fixedly attached to wheel 60 as by welding to axle 63. A locking pin socket 64 shown tapered in cross-section in FIG. 4 is fixedly secured to tube 62 for receiving the locking pin 71 to be hereinafter described. It should be understood that the cylindrical configuration of wheel attachment member 62 is not the only configuration. Within the limit that it must correspond to front suspension member 53, it may be of any suitable configuration.

In the case of the skis designed for attachment to the front suspension system, each ski is provided with a hollow tube-like ski attachment member 65 which is pivotedly attached to a pivot bracket 66 by means of pivot pin 67. A rubber pivot grommet 68 is provided around pivot pin 67 to frictionally dampen ski pivoting, to serve as a ski vibration damping device and to provide a non-lubricated pivot point. As was described with reference to the wheel attachment member 62, ski attachment member 65 is provided with a pivot pin socket 64 which again is tapered in cross-section for receiving locking pin 71. Again, there is no one configuration for ski attachment member 65. It must correspond with front suspension member 53, but may be of any suitable configuration.

Each wheel attachment member 62 and each ski attachment member 65 is slightly larger in cross-section than the cross-section of front suspension members 53. A relatively close tolerance should be followed in the construction of these members so that wheel or ski attachment members 62 and 65 respectively, may be inserted over their respective front suspension members 53 and removably attached thereto with a minimum of play between the members.

The locking pin mechaNism which secures either wheels 60 or skis 61 to the front suspension system is attached to lever arm 59 by means of locking pin bracket 70. A locking pin 71 having a first and second end is secured to locking pin bracket 70 with first end 72 being tapered for insertion into locking pin sockets 64 secured to wheel attachment members 62 or ski attachment members 65. A shank portion 73 at the second end of each locking pin 71 is reduced in diameter relative to bracket 70 so that a coil spring 74 may be interposed within the cylindrical portion of bracket 70 and surrounding shank 73 to bias locking pins 71 in the direction of its longitudinal axis and to urge nose 72 outward into locking pin sockets 64 when the device is assembled. Pull rings 75 are attached to shanks 73 whereby pins 71 may be pulled from engagement with pin sockets 64. Cotter keys 76 are provided on either side of shanks 73 to secure coil springs 74 within brackets 70 and to provide a seat for coil springs 74. Duel cotter keys 76 are provided in each locking pin 71 as a safety precaution to prevent accidental removal of locking pin 71.

The operation of the wheel or ski attachment mechanism is relatively simple. A wheel or a ski with its wheel attachment member 62 or ski attachment member 65 respectively is simply slid onto front suspension shaft 53. Ring 75 attached to shank 73 on locking pin 71 is grasped and pulled backward to cause nose 72 of locking pin 71 to receed within bracket 70. When locking socket 64 on a wheel or a ski attachment member is aligned with a locking pin 71, ring 75 is released and coil spring 74 urges locking pin 71 outward so that nose 72 is guided within the tapered portion of locking pin socket 64 to attach wheel 60 or ski 61 as desired to the suspension system. The tolerance of front suspension member 53 within the wheel or ski attachment member 62 and 65 respectively prevents accidental disengagement of locking pin 71 from locking pin socket 64 unless ring 75 is pulled to remove locking pin 71. On the other hand, in the event it is desired to exchange wheels for skis all that is necessary is that the pins 71 be pulled and the wheel or skis removed and exchanged.

Skis 61 are specially designed for use with the vehicle. A hand grip 77 is provided at the front of each ski and a ski bumper 77a is provided at the rear of each ski. Hand grips 77 aid in handling the vehicle, and ski bumpers 77a prevent damage to the ski or vehicle when the ski pivots. Additionally, each ski tip is formed in a reverse curve 78 so that the tip points forward to inhibit piling of the snow under the ski tip. Each pivot bracket 66 is secured within the hollow interior of the ski to reduce wear on the pivot point and inhibit snow from jamming the pivot action. Rusting or freezing of the pivot assembly is also reduced. A rib 78a is affixed to the bottom of each ski to reduce ski wear and increase traction.

The traction assembly 23 of vehicle 20 comprises a wobble boggie assembly 79, a track 80, a track elevation mechanism 81 and an engine and transmission 82 which can be any standard engine and transmission with sufficient power and gear ratio to provide the necessary driving force for the vehicle. The power takeoff from the engine to drive the vehicle is provided at one side of engine 82 with a chain and sprocket drive 83 also on one side of engine 82 comprising any standard chain and sprocket assembly. The chain is connected to front drive sprockets 84 which in turn fit into slots 80a in track 80 which is an endless belt track. The track itself is supported b the wobble boggie assembly 79 to be hereinafter more particularly described in conjunction with the rear track idler sprocket elevation mechanism 81 also to be described later.

The wobble boggie system consists of a plurality of pairs of boggie wheels 85 which pairs are secured in groups of 3 to axles 86, 87 and 88 respectively. As shown in FIGS. 8 and 9 three axles 86, 87 and 88, each having three pairs of boggie wheels 85 pivotedly attached thereto, are provided across the track 80 so that it is supported by the wobble boggie system at 18 points. Each pair of boggie wheels 85 is secured to its respective axle 86, 87 or 88 by means of biforcated brackets 90 which are pivotedly secured to respective axles by any suitable means such as by rubber grommets. The biforcations on brackets 90 project on each side of boggie wheels 85 and the wheels are pivotedly secured to the brackets by means of boggie wheel axles 91 which are inserted through wheels 85 and secured to the protruding sides of bracket 90. Wheels 85 may be rotatably secured on boggie wheel axles 91 as by means of sealed ball bearings or some other suitable bearing means.

The wobble boggie system is connected together and in turn secured to track housing 32 by means of longitudinal leaf springs 92. Each longitudinal leaf spring 92 is pivotedly secured to main spring pivot 93 which in turn is secured to track housing 32. Leaf springs 92 may be riveted, bolted or welded to the main spring pivots 93 as shown in FIGS. 2 and 3. Leaf springs 92 are connected to the axles 86, 87 and 88 by means of elongated spring arms 94 and 95. Boggie axle attachment members 96 connect elongated spring arms 94 and 95 to axles 86 and 88 and spring end pivot sleeves 97 loosely connect the ends of elongated spring arms 94 and 95 adjacent axle 87. Spring end pivot sleeves 97 are connected to axle 87 by means of attachment brackets 98.

The independent attachment of each pair of boggie wheels to an axle allows that pair of boggie wheels to pivot independently of the other boggie wheels so that if they encounter an obstacle they can move over the obstacle without lifting the entire assembly off of the ground. The axle to which a pair of wheels is attached is half way between each wheel in the pair to minimize its vertical movement when a pair of wheels moves over an obstacle. Additionally, the independent pivoting of the boggie wheels will enable the remaining boggie wheels and particularly those secured to other axles to remain in contact with the surface so that traction loss is minimized. The longitudinal leaf spring attachment of the boggie system to the vehicle itself allows independent suspension of the vehicle to minimize lurching or rolling. The spring and boggie system absorbs the contours of the terrain over which the vehicle is passing to minimize the shock to the vehicle.

Figure 1:
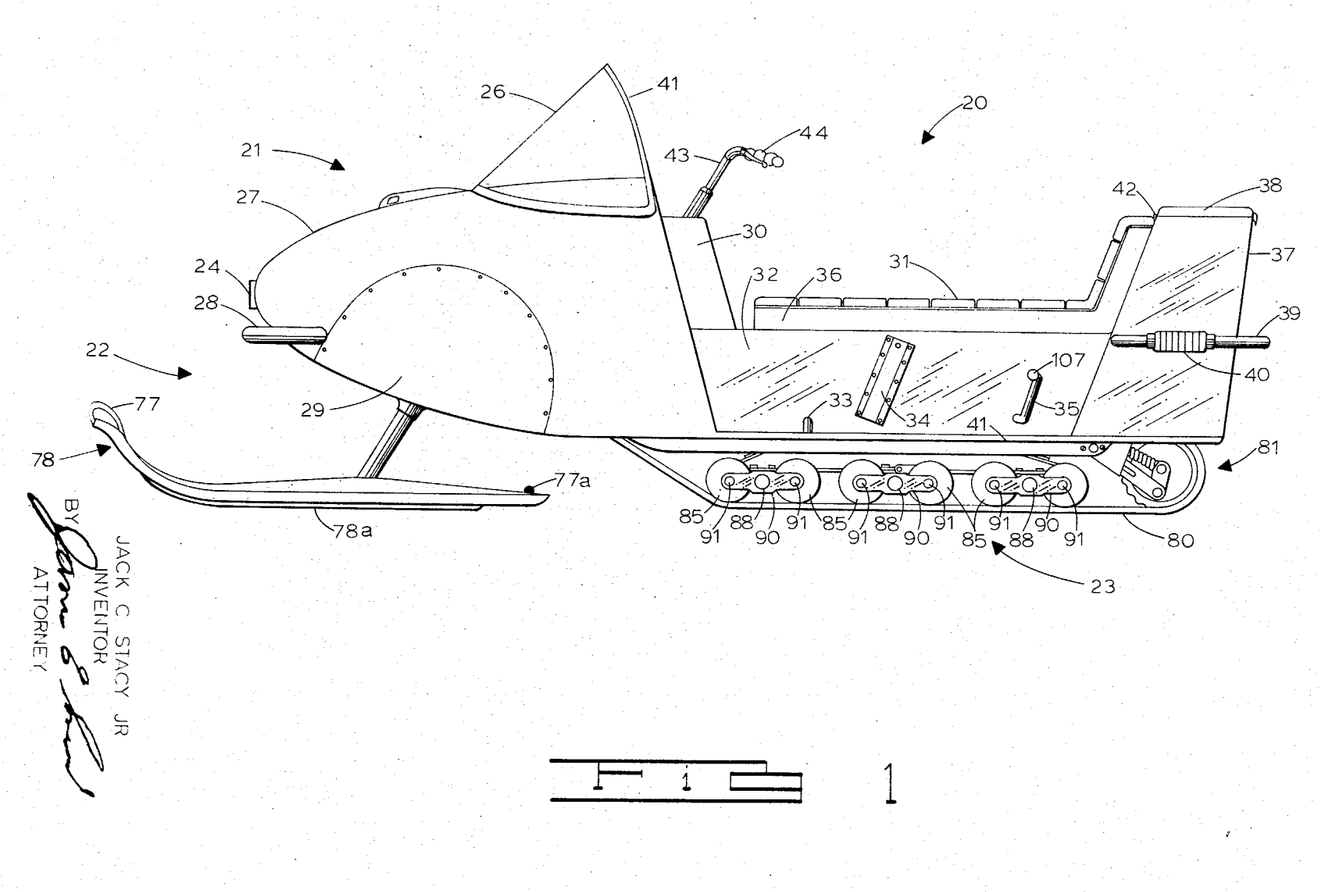
FIG. 1 is a side view of the improved overland vehicle.

Each side of track 80 is provided with a rear track idler sprocket 100 and an upper stationary track idler 101. The teeth of each rear track idler sprocket 100 engage slots 80a in the respective side of track 80. Each sprocket 100 is attached to a rear idler sprocket axle 102 and thence through a pivot arm 109 and dual suspension arms 111 to a lever arm 103. Each dual suspension arm 111 and lever arm 102 is supported on the body 21 of the vehicle by a rear sprocket lever arm pivot pin 104 which passes across the body of the vehicle connecting and supporting the elevation systems on each side of the vehicle and providing a pivot point therefore. A lever arm linkage 105 is pivotedly secured at one end by pivot pin 106 to lever arm 103 and at the other to a locking knob 107. As shown in FIG. 1 locking knobs 107 protrude through the side 32 of body housing 21 and may be moved up and down in slot 35 to actuate lever arm 103 to move rear idler sprocket assembly 100 up and down and thus elevate and depress the idler sprocket. Wedge shaped ends 103a and 103b of lever arm 103 extend on each side of dual suspension arms 111 to provide upper and lower limits of movement of arms 111 about pivot point 104. End 103a provides an engagement surface for the upper leg of mouse trap spring 108 while its lower leg is attached to arm 111.

A mouse trap spring 108 is the rear suspension spring for the elevation mechanism, having one side attached to rear sprocket lever arm 103 and the other side engaging rear sprocket dual suspension arms 111. Track tension spring 110 is a coil spring attached at one end to lever arm 103 and at the other end to rear idler pivot arm 109 to keep constant pressure on rear idler sprocket 100 forcing it outward against track 80 to keep it tight.

Thus it may be seen that rear idler sprocket 100 is maintained in constant contact with and pushing against track 80 by means of track tension spring 110. Rear idler sprocket assembly 100 may be elevated and depressed by the coaction of lever arm 103 which is attached at one end to locking knob 107 through linkage 105 and at the other end dual rear suspension arms 111 which in turn engage pivot arm 109 to move axle 102. Lever arm 103 pivots about pivot pin 104 and by engaging dual suspension arms 111 provides the leverage for movement of rear idler sprocket 100. Mouse trap springs 108 serve as shock absorbers for the rear system.

Thus rear idler sprocket can be elevated to remove it from sand and dirt or depressed to provide greater surface contact for the vehicle.

What is claimed is:

1. In an improved overland vehicle, the combination comprising:
   A body assembly, a steering assembly, and a track drive and support assembly all of which are operably connected together to from a vehicle;
   engine and transmission means secured within said body assembly for supplying the power to said track drive assembly;
   track means operably connected to said track drive and support assembly for moving said overland vehicle;
   said steering assembly incorporating an improved independent front suspension system comprising;
   an upper suspension mount fixedly secured to the body assembly;
   first and second telescoping upper suspension supports fixedly attached at one end to said upper suspension mount;
   first and second front suspension shafts, each having a bottom portion and a top portion, said first and second telescoping upper suspension supports being slideably inserted into the top portion of said first and second front suspension shafts respectively;
   a pair of surface contacting members;
   attachment means fixedly connected to said surface contacting members for removably attaching each of said surface contacting members to one of said front suspension shafts;
   a coil spring seated within each of said front suspension shafts having one end removably seated in the bottom portion of each of said front suspension shafts and the other end engaging that end of the respective upper suspension support which extends within its respective front suspension shaft;
   dust cover means connecting each of the upper suspension supports to its respective front suspension shaft and enclosing the point of insertion of each upper suspension support into its respective front suspension shaft.

2. The invention as defined in claim 1, including:
   A double "A" frame support assembly spaced between and joining the first and second front suspension shafts with the apex of each "A" being pivotedly attached to one of said front suspension shafts by means of a "U" bracket and the legs of each "A" being pivotedly connected to the legs of the opposite "A" by means of another "U" bracket.

3. The invention as defined in claim 2, including:
   A steering rod rotatably attached to the body assembly;
   a pair of tie rods having first and second ends with the first ends being operably connected to said steering rod and extending radially therefrom;
   a pair of lever arms, one being fixedly attached to each of said front suspension shafts and extending perpendicular to the longitudinal axis thereof;
   said second ends of each of said tie rods being pivotedly connected to one of said lever arms;
   whereby rotational movement of said steering rod is transmitted to said front suspension members through said tie rods in said lever arms.

4. The invention as defined in claim 3, wherein:
   said attachment means for removably attaching each surface contacting member to its respective front suspension shaft comprises a hollow member attached to said surface contacting member of the same configuration as the front suspension shaft but larger in diameter, and a pin and socket assembly;
   said socket comprising a hollow member having a tapered hole through its interior along its longitudinal axis, and being fixedly secured to said attachment member and perpendicular to the longitudinal axis thereof;
   said pin comprising elongated member having a shank at one end and a tapered point at the other end and being attached to one of said lever arms on one of said front suspension shafts by means of a bracket;
   the longitudinal axis of said pin being aligned with the longitudinal axis of said socket when the hollow member is fully inserted onto one of said front suspension shafts so that the tapered end of said pin may be inserted into said socket.

5. The invention as defined in claim 4, wherein:
   said surface contacting members comrpise a pair of wheels.

6. The invention as defined in claim 4, wherein;
   said surface contacting members comprise a pair of skis;
   a bracket, pivot pin and rubber grommet operably connected together to pivotedly attach said hollow member to said skis.

* * * * *